United States Patent [19]

Hager, Jr.

[11] Patent Number: 4,471,212
[45] Date of Patent: Sep. 11, 1984

[54] LIGHT WEIGHT THIN BUCKLE-RESISTANT CEILING HEATING PANEL

[75] Inventor: Nathaniel E. Hager, Jr., Lancaster, Pa.

[73] Assignee: Armstrong World Industries, Inc., Lancaster, Pa.

[21] Appl. No.: 332,751

[22] Filed: Dec. 21, 1981

[51] Int. Cl.³ .............................................. H05B 3/36
[52] U.S. Cl. .................................................... 219/345
[58] Field of Search ............................... 219/342–344, 219/345, 347, 353, 354, 355

[56] References Cited

U.S. PATENT DOCUMENTS

| 2,328,666 | 9/1943 | Musgrave | 219/345 |
| 3,010,007 | 11/1961 | Theodore et al. | 219/345 |
| 3,020,379 | 2/1962 | Ludlow et al. | 219/354 |
| 3,146,340 | 8/1964 | Dewey et al. | 219/345 |
| 3,397,301 | 8/1968 | Hager, Jr. | 219/354 |
| 3,591,753 | 7/1971 | Gartner | 219/345 |
| 3,603,764 | 9/1971 | Martin | 219/345 |
| 3,657,516 | 4/1972 | Fujihara | 219/345 |
| 3,859,504 | 1/1975 | Motokawa | 219/345 |
| 3,866,016 | 2/1975 | Tomba | 219/345 |
| 3,935,422 | 1/1976 | Barnes et al. | 219/345 |
| 3,947,658 | 3/1976 | Sato et al. | 219/345 |
| 4,107,512 | 8/1978 | Brandenburg, Jr. | 219/343 |

FOREIGN PATENT DOCUMENTS

| 2705472 | 8/1978 | Fed. Rep. of Germany | 219/548 |
| 51-341 | 1/1976 | Japan | 219/345 |

Primary Examiner—Roy N. Envall, Jr.
Assistant Examiner—Geoffrey S. Evans

[57] ABSTRACT

The invention is directed to a radiant heat ceiling panel which operates at low temperature and transmits heat directly by radiation. The basic panel structure consists of a fibrous heating element covered on both sides with polyester sheets and backed by a rigid fiberglass backing and faced with a decorative layer which serves as the heat radiating surface. Most of the elements of the heating panel are made of materials or nearly equal coefficients of expansion. The complete panel is mounted in a frame with an edge raised above the surface of the decorative layer.

3 Claims, 2 Drawing Figures

LIGHT WEIGHT THIN BUCKLE-RESISTANT CEILING HEATING PANEL

BACKGROUND OF THE INVENTION

1. Field of the Invention

The invention is directed to a heating panel and, more specifically, to a thin, large surface heating panel adapted for use when mounted on a ceiling.

2. Description of the Prior Art

U.S. Pat. No. 3,935,422 discloses an electrically heated laminate. The laminate can be employed as an electrically heated ceiling tile and the laminate includes in sequence, a glass wool backing, a flexible heater fabric, and an electrically insulating decorative face sheet of woven glass fabric.

U.S. Pat. No. 3,603,764 discloses an electrical prefinished heating panel having a layer of heat conducting material and a layer of heat insulating material with an electric heating element sandwiched therebetween. This heating panel is used with conventional or acoustical ceiling tile to form the ceiling of a room and the heat conducting material is provided with a pattern or design.

U.S. Pat. No. 4,107,512 discloses an insulated radiant heater which is suspended from a ceiling and is mounted in a peripheral frame.

SUMMARY OF THE INVENTION

The invention is directed to a thin, large surface heating panel adapted for suspension from a suspended ceiling system or adapted for mounting directly on a ceiling. The heating panel has an insulation backing. Positioned under the insulating backing there is a heating element which consists of a carbon containing felted fiber heating element having bonded thereto on both sides thereof a polyester sheet. Appropriate copper electrodes are fastened to the heating element. Positioned under the heating element there is a decorative aluminum sheet. The different elements of the heating panel are adhesively bonded together. All of the elements of the heating panel are made of materials of nearly equal coefficients of expansion so that expansion with heating and contraction upon cooling will not buckle the thin heating panel.

DESCRIPTION OF THE PREFERRED EMBODIMENT

Figure 2:
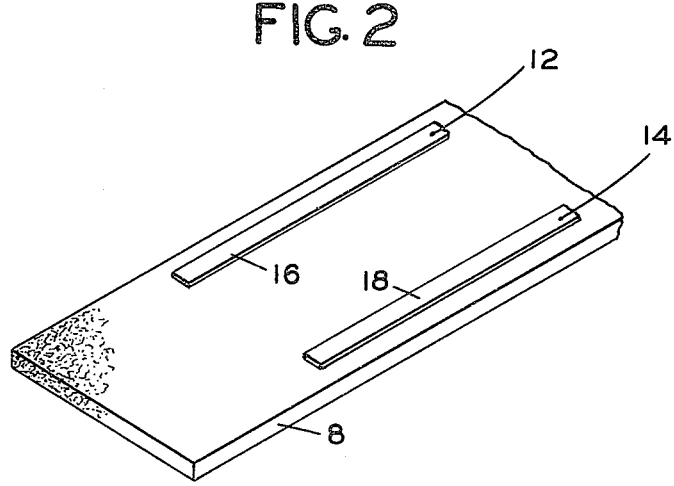
FIG. 2 is a perspective view of the heating element.

The invention is directed to a thin, approximately one and one-half inches thick, large surface, approximately two feet by four feet, heating panel adapted for suspension from the conventional suspended ceiling system or adapted for mounting directly on the structural ceiling of a building. The heating panel is composed of an insulation backing 2 which is a $\frac{7}{8}$" thick rigid glass fiber material that has a density of about 3 pounds per cubic foot. Adhesively fastened by adhesive layer 4 is a 2 mil Mylar layer 6 which is DuPont type EL Mylar. Adhesively fastened to this Mylar layer, and with an overall dimension smaller than that of the insulation backing 2 and Mylar layer 6 which are both approximately the same size, is a carbon containing felted fiber heating element 8. A suitable material for the heating element is a product called "Temsheet" a trademark product of Armstrong World Industries, Inc. The Temsheet product is made by a beater saturation process using cellulosic fibers, although asbestos fibers may be used. Any conventional process such as the so-called alum-ammonia process may be used to better saturate the fibers with a suitable amount of elastomeric binder. A conductive material, usually acetylene black, is introduced into the fibrous slurry prior to the deposition of the binder onto the fibers. Conventional paper making procedures are used throughout. The final sheet after suitable drying, and perhaps pressing, conducts electricity and generates heat due to the sheet's resistance. The sheet has an electrical resistance of 80 to 90 Ohms per square. Fastened to the opposite side of the heating element 8 is a second Mylar sheet 10 made of the same material as the Mylar sheet 6 but 5 mils thick. Both sheets 6 and 10 are adhesively bonded to the heating element 8 and the Mylar sheets extend beyond the perimeter of the heating element so that the heating element is totally encapsulated within the Mylar sheets. The Mylar sheets thus seal oxygen away from the heating element and meets the appropriate Underwriter Lab's requirement for long life of the heating element at operating temperature. Copper strips $\frac{1}{2}$" wide and 2 mils thick are fastened to the edges on one side of the heating element 6 so that electrical conductors 12 and 14 may be connected to the heating element. In FIG. 2, the electrical conductors 12 and 14 are shown fastened to the copper strips 16 and 18. The strips are adhesively bonded to the heating element 8 by any conventional carbon loaded adhesive which may be conventionally used to bond together elements of a heater.

Adhesively bonded to Mylar layer 10 is a 10 mil aluminum foil layer 20 which may be provided with some decoration on the side facing away from the heating element. This decoration could be some embossed effect or an appropriate heat resistant paint provided to the outward face of the sheet 20.

The Mylar layer 6 is adhesively bonded to the glass fiber backing through the use of any conventional acrylic latex adhesive, for example, an acrylic latex adhesive No. 17189 put out by Armstrong World Industries, Inc.

The Mylar sheets 6 and 10 are bonded to each other around their perimeter and are also bonded to the fiber heating element 8 through the use of a polyester adhesive such as the Bostik #7064 heat resistant polyester adhesive put out by the Bostik Division of the U.S.M. Corporation. The adhesive layers are shown as layers 7 and 9 in the drawing. The Mylar layer 10 is fastened to the aluminum layer 20 through the use of the same Bostik polyester adhesive above described and shown as layer 11. A paint coat 25 provides the decorative surface on the aluminum layer 20.

Normally when a thin lightweight structure is heated in a range from 70° F. to 220° F. normal expansion differences in materials could cause thermal stresses, the rupturing of adhesive bonds and warping and buckling. However, herein the Mylar layers, the adhesive used there against, and the aluminum sheet all are made with approximately the same coefficient of thermal expansion and this is in the range of approximately $17 \times 10^{-6}$ inches per inch degree Centigrade. The copper electrodes 16 and 18 on the Temsheet have approximately the same coefficient of expansion. The Temsheet itself is a flexible felt and, although it may have a slightly higher coefficient of expansion, the high tensile strength Mylar should have little difficulty constraining the Temsheet. The Temsheet has a density ranging between about 20–30 pounds per cubid foot and therefore is at least 50% open space and readily subjected to whatever compression is needed to constrain expansion. The different adhesives used to bond together the different layers are of sufficient elasticity to permit small distortions to take place reversibly. The same is true of the fiberglass in that it will be able to handle any distortion without warping. In off-on cycling experiments even up to 300° F., the above structure shows little tendency for warping.

Figure 1:
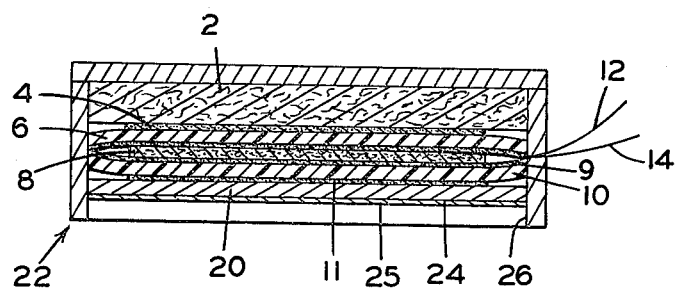
FIG. 1 is a cross-sectional view of the invention.

Finally, the heating panel is placed within a frame which is shown as element 22 in FIG. 1. The sides of the frame extend around the heating panel as shown, and the frame actually extends from $\frac{1}{4}''$ to $\frac{3}{4}''$ above the decorated surface 24 of layer 20. If the lip 26 of the frame 22 did not extend beyond the surface 24 of the heating panel, then warm air adjacent the surface 24 would move by convection from surface 24 off the side of the heating panel and towards the ceiling structure to which the heating panel is mounted. For proper efficient operation of the heating panel it is desirable that there be trapped stationary air around the heated panel face 24.

Finally, it is possible that the copper conductors 16 and 18 could be fastened to the fiber heating element 8 through the use of stitching with polyester thread to hold the electrical connector 16 and 18 in contact with the element 8. An appropriate power source provides 120 volts to the electrical connectors 12 and 14 to provide the electric current which is necessary for the operation of the heating panel.

To get an efficient heater, that is, to get maximum useful radiant output for a given rated temperature for the heating element, one should have a total thermal resistance between the heating element and the exposed surface lower than about 0.05 ft$^2$-h-°F./Btu. It should be noted that the calculated thermal resistance of the above-described structure is about 0.026 ft$^2$-h-°F./Btu, and the actual measured temperature difference between the exposed surface and the heating element of a test heat panel made as above described was 6° F. This calculates to give a thermal resistance in an actual test panel of 0.03 ft$^2$-h-°F./Btu.

What is claimed is:

1. A thin, large surface heating panel adapted for suspension from a suspended ceiling system, or adapted for mounting directly on a ceiling, comprising:
   (a) an insulation backing,
   (b) positioned thereunder a heating element consisting of:
      (1) a carbon containing felted fiber compressible heating element having bonded thereto on both sides thereof a polyester sheet,
      (2) copper electrodes fastened to said heating element,
   (c) positioned under said heating element there being a decorative approximately 10 mil thick aluminum sheet, with a decorative surface facing away from the heating element,
   (d) all said elements of the heating panel being adhesively bonded together, and
   (e) the polyester sheets, the aluminum sheet and the adhesive being made of materials of nearly equal coefficients of expansion so that expansion with heating and contraction upon cooling will not buckle the thin heating panel or particularly not buckle the thin aluminum sheet.

2. The thin, large surface heating panel of claim 1 wherein the felted fiber heating element has a 50% open area and is made with an acrylic latex binder, said heating element can be subjected to compressive stresses without buckling and will be of sufficient elasticity to permit a small distortion in its dimensions to take place and yet return to its original size.

3. The thin, large surface heating panel of claim 2 wherein the heating panel is mounted in a frame and said frame has the upper edge thereof extending approximately $\frac{1}{4}''$ to $\frac{3}{4}''$ above the decorative surface around the perimeter of the aluminum sheet to trap stationary air adjacent the decorative surface of the aluminum sheet and prevent spilling of hot air off the surface of the aluminum sheet and rising to the area above the upper edge of the frame.

* * * * *